United States Patent Office 2,873,479
Patented Feb. 17, 1959

2,873,479
CURING FLAP FOR RECAPPING PNEUMATIC TIRES

Henry Di Pietro, Morgantown, W. Va., assignor to Andy Brothers Tire Shop, Morgantown, W. Va.

Application August 17, 1956, Serial No. 604,699

1 Claim. (Cl. 18—45)

This invention relates to a curing flap for recapping tires.

An outstanding disadvantage of conventional recapping machines is that they require a collapsible retaining ring for rigidly supporting the air bag, also they require a different size air bag for each size of tire. Thus the recapper must stock various sized rings and various sized air bags to be equipped to recap all sizes of tires, which adds considerably to his overhead expense.

An object of the present invention is to provide a novel curing flap, which is highly useful for recapping tires and which eliminates altogether the necessity for the above mentioned collapsible retaining rings or air bags, thereby considerably reducing overhead costs for tire recapping.

A more specific object of the present invention is to provide a novel curing flap that will automatically fit all sizes of passenger car tires and which will maintain a perfect seal, which flap is of relatively inexpensive construction, also which is very easily and quickly operable during the recapping process, therefore which lends itself to speedy mass production of recapped tires.

Other objects and advantages of the invention will become more apparent from a study of the following specification, taken with the accompanying drawing wherein.

Figure 1:
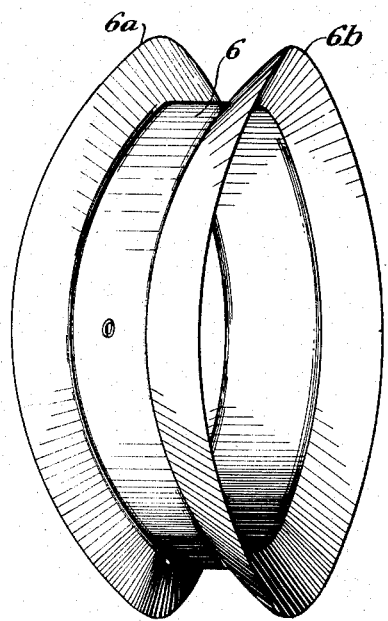
Figure 1 is a side perspective view of a tire curing flap embodying the principles of the present invention.

Referring more particularly to the drawing, numeral 1 denotes a vehicle pneumatic rubber tire to be recapped by a camelback layer 2 by enclosing it in a mold comprising mold halves 3 and 4 and a die 5 molded with the desired tire tread impressions.

Figure 3:
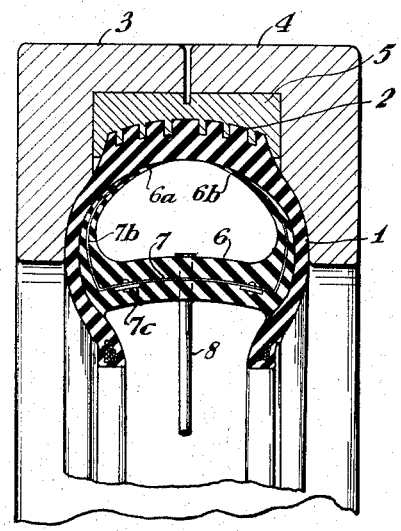
Figure 3 is a transverse cross-sectional view of a tire recapping mold equipped with the curing flap shown in Figs. 1 and 2.
Figure 4:
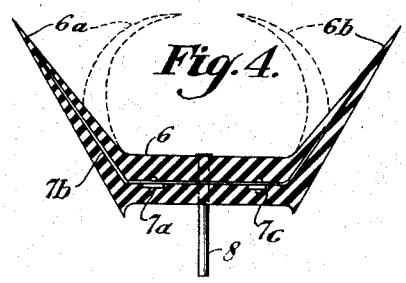
Figure 4 is a transverse, cross-sectional view of the tire curing flap when removed from the tire.

The curing flap 6, embodying the present invention, is made of rubber and is of the shape illustrated more clearly in Figures 1, 3, and 4. It is in the form of a cylindrical ring having winged edges or sides 6a and 6b which are tapered or feathered. The central portion of the ring is relatively thick, preferably more than 1 inch thick whereas the wings are about 5 inches in length. In order to provide greater rigidity of the central portion, it is preferably reinforced with a reinforcing unit such as 7 comprising a plurality of spaced, steel strips 7b attached by rivets or other suitable fastening means 7a to a pair of spaced steel rings 7c. The strips 7b have angularly disposed end portions which are embedded in rubber wings 6a and 6b to reinforce them and make them normally assume the position shown in Figure 4.

However, when the curing flap 6 is inserted in tire 1 the wings will become flexed by the inner wall of the tire to the position shown in dash lines in Figure 4, and in so doing, will closely hug the inner wall. The central portion can be bowed in order to facilitate insertion.

Air under pressure is then introduced into the tire through tube 8 and a suitable valve (not shown) whereby the air pressure will force the feathered edges of flaps 6a and 6b against the inner wall of the tire so as to form a tight seal and prevent escape of the air. Thus the tire is backed up by a high pressure cushion that enables the formation of clear cut tread impressions as distinguished from irregular impressions formed in many conventional molds because of an insufficiently inflated cushion, giving rise to dynamic unbalance of the tire.

Of course, after the molding operation has been completed and the air removed from the space between the flap and tire, the flap may be squeezed together at its central portion and removed from the tire casing without the need of special tools as required with retaining, adjustable rings and the like.

While reinforcing 7 has been described as being preferably of steel, it may be made of any other metal, preferably spring metal, or of other materials such as multiply fabric or plastic, such as nylon.

Figure 5:
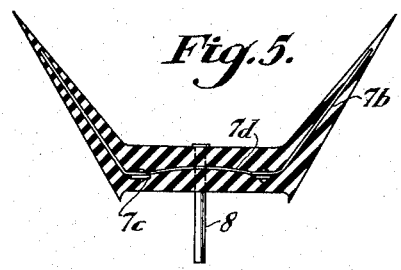
Figure 5 is a transverse, cross-sectional view of a modification of the tire curing flap.

Figure 5 shows a modification wherein the central portion 7d is normally bowed to facilitate bowing of the central portion of the rubber when squeezed together before insertion in the tire, also to better resist the outward bowing tendency caused by abnormal air pressure. The rubber surrounding the central portion may also be correspondingly bowed if so desired (not shown).

A significant feature of the curing flap is that it is self supporting and requires no backing, such as afforded by a retaining or adjustable ring. Moreover, no air bag is required because it provides, in effect, a sealed air bag when slipped in place. And most important, because of its particular configuration, a single curing flap can be used for recapping a wide variety of tire sizes, such as all sizes for passenger vehicles, and thus eliminate the necessity for stocking separate metal rings and air bags as customarily required. Furthermore it does not require the use of beads to form a seal since the feathered wings are self-sealing.

Figure 2:
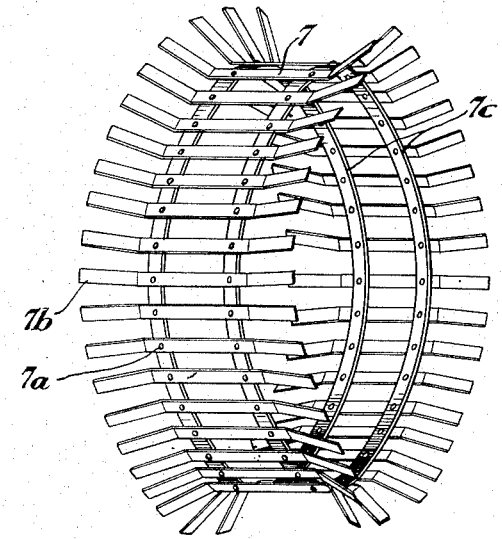
Figure 2 is a side perspective view of the reinforcing embedded in the curing flap shown in Figure 1.
Figure 2A:
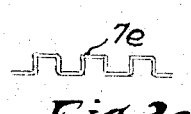
Figure 2a is a fragmentary view of a modification of strip 7b.

Instead of providing flat, metal reinforcing strips 7, other shapes of spring metal strips may be used, such as, for example spaced, parallel sinuous shaped spring metal strips such as 7e shown in Figure 2a, having bent end portions like 7b, in which case rings 7c may be omitted if desired.

Thus it will be seen that I have provided an efficient curing flap for recapping tires, which flap is of such construction as to fit a wide variety of tire sizes and to form, automatically, an air tight seal therewith when air, under pressure, is introduced between the flap and tire, therefore eliminating the necessity for stocking a variety of sizes of metal rings and air bags, and eliminating their expense; furthermore, I have provided a reinforced curing flap of springy construction so as to be self sealing and which can be squeezed centrally prior to introduction in a tire, so as to greatly simplify and speed up the recapping operation, and eliminate laborious operations and the necessity for special tools, as ordinarily required; also I have provided a tire curing flap that is relatively simple in construction and very inexpensive yet highly reliable in operation.

While I have illustrated and described several embodiments of my invention, it will be understood that these are by way of illustration only, and that various changes and modifications may be made within the contemplation of my invention and within the scope of the following claim.

I claim:

A tire recapping machine comprising a pair of confronting mold halves, a tread-impressing die enclosed therein, said mold halves having confronting, curved well portions forming a seat for only the outer half of the cross section of a tire to be recapped, the inner half of the tire being unsupported by said mold halves, a tire curing flap extending across substantially the center of the tire interior and comprising a thick rubber ring of bowed cross-section with the convex portion confronting the interior wall of the tread-impressing die and having angularly outwardly disposed feathered edge portions forming seals with the inner sidewall surfaces of the tire, said edge portions forming, with said ring, a substantially U-shaped cross-section, an air inlet tube extending through a central portion of said ring for introducing air under pressure, reinforcing metallic means embedded in said ring and edge portions, the portion of said reinforcing metallic means contained in said ring portion being bowed in the direction of said die for facilitating collapse of said ring portion for preventing buckling of said ring portion as a consequence of air pressure build up between the flap and the tire interior wall, and whereby tires of different sizes may be recapped by said machine without the necessity of additional metallic support rings.

References Cited in the file of this patent

UNITED STATES PATENTS

| | | |
|---|---|---|
| 1,779,385 | Wirgman | Oct. 21, 1930 |
| 2,553,722 | Peigney | May 22, 1951 |
| 2,597,550 | Tritt | May 20, 1952 |